(12) United States Patent
Lowell

(10) Patent No.: US 10,205,323 B2
(45) Date of Patent: Feb. 12, 2019

(54) HYDROELECTRICITY AND COMPRESSED-AIR POWER CONVERTER SYSTEM

(71) Applicant: James Arthur Lowell, Charlotte, NC (US)

(72) Inventor: James Arthur Lowell, Charlotte, NC (US)

(*) Notice: Subject to any disclaimer, the term of this patent is extended or adjusted under 35 U.S.C. 154(b) by 91 days.

(21) Appl. No.: 15/359,224

(22) Filed: Nov. 22, 2016

(65) Prior Publication Data

US 2017/0074230 A1 Mar. 16, 2017

Related U.S. Application Data

(63) Continuation-in-part of application No. PCT/IB2015/058851, filed on Nov. 16, 2015, and a continuation of application No. 14/550,011, filed on Nov. 21, 2014.

(51) Int. Cl.
| | |
|---|---|
| *H02J 3/00* | (2006.01) |
| *H02J 3/38* | (2006.01) |
| *F03B 17/00* | (2006.01) |
| *H02K 53/00* | (2006.01) |
| *H02K 7/18* | (2006.01) |
| *H02J 15/00* | (2006.01) |

(52) U.S. Cl.
CPC ............ *H02J 3/382* (2013.01); *F03B 17/005* (2013.01); *H02J 15/006* (2013.01); *H02K 7/1807* (2013.01); *H02K 7/1823* (2013.01); *H02K 53/00* (2013.01); *F05B 2210/11* (2013.01); *F05B 2210/12* (2013.01); *F05B 2220/32* (2013.01); *F05B 2220/60* (2013.01); *F05B 2220/706* (2013.01); *Y02B 10/50* (2013.01); *Y02E 10/28* (2013.01); *Y02E 10/38* (2013.01); *Y02E 60/15* (2013.01); *Y02E 60/17* (2013.01); *Y02E 70/30* (2013.01)

(58) Field of Classification Search
CPC ........ F03B 13/24; F03B 17/06; F03B 17/067; F03B 9/00; H02K 1/1807
USPC ...... 290/54, 43; 416/7, 8, 85; 415/5; 60/325
See application file for complete search history.

(56) References Cited

U.S. PATENT DOCUMENTS

| | | | | |
|---|---|---|---|---|
| 2,652,690 A | * | 9/1953 | Labriola ................. | F03B 13/00 60/398 |
| 3,076,096 A | * | 1/1963 | Bachmann ............. | H02K 35/02 159/DIG. 32 |
| 6,359,347 B1 | * | 3/2002 | Wolf ..................... | F03B 13/086 290/43 |

(Continued)

*Primary Examiner* — Julio C. Gonzalez

(57) ABSTRACT

A hydroelectricity and compressed-air power converter system includes a first fill pool, a plurality of internal fill tanks, an external fill tank, a wave channel, a plurality of air-generator systems, a second fill pool, at least one air storage tank, and at least one generator system. The first fill pool is intermittently in fluid communication with the external fill tank through the plurality of internal fill tanks while the external fill tank is intermittently in fluid communication with the second fill pool through the wave channel. The second fill pool is selectively in fluid communication with the first fill pool through the at least one generator system so that a set amount of water can be circulated within the power converter system as it generates compressed-air from the plurality of air-generator systems and hydroelectricity from the at least one generator system.

19 Claims, 9 Drawing Sheets

(56) References Cited

U.S. PATENT DOCUMENTS

| | | | | |
|---|---|---|---|---|
| 9,546,642 B2* | 1/2017 | Deng | ............... | F03B 13/00 |
| 2006/0032374 A1* | 2/2006 | Vrana | ............... | B01D 19/0042 |
| | | | | 95/258 |
| 2011/0204645 A1* | 8/2011 | Jacobson | ............... | F03B 13/08 |
| | | | | 290/54 |
| 2011/0260460 A1* | 10/2011 | Rovinsky | ............... | F03B 13/10 |
| | | | | 290/54 |
| 2011/0289913 A1* | 12/2011 | Welch, Jr. | ............... | F03B 13/187 |
| | | | | 60/495 |
| 2012/0096830 A1* | 4/2012 | Manoharan | ............... | F01D 1/16 |
| | | | | 60/204 |
| 2012/0119510 A1* | 5/2012 | Herzen | ............... | F03D 9/17 |
| | | | | 290/1 C |
| 2013/0038062 A1* | 2/2013 | Salu | ............... | F03B 13/06 |
| | | | | 290/52 |

* cited by examiner

US 10,205,323 B2

HYDROELECTRICITY AND COMPRESSED-AIR POWER CONVERTER SYSTEM

The current application is a continuation-in-part (OP) application of the U.S. non-provisional application Ser. No. 14/550,011 filed on Nov. 21, 2014.

FIELD OF THE INVENTION

The present invention relates generally to power generation. More specifically, a wave channel the present invention converts wave power of a water flow into compressed-air so that the generated compressed-air and the water flow can be utilized within at least one generator system of the present invention to generate hydroelectricity.

BACKGROUND OF THE INVENTION

As technology and industry in the modern world continues to grow and expand, so do the power requirements. Many different sources of power generation exist today involving: fossil fuel burning, solar, wind, geothermal, hydroelectric, wave and current power generation, etc. Hydroelectric and wave energy that use the movement of a water flow to generate electric power is one of the environmentally friendly method of power generation. Hydroelectric generation normally accomplishes through a dam and a plurality of hydro-turbines as the gravitational potential energy of the water retained by the dam is converted into electric energy by the plurality of hydro-turbines. Hydroelectricity is a valuable source of energy since it is renewable; it has a low cost and produces significantly less waste since it does not require hydrocarbons to be burned. The wave energy also produces clean energy source as wave generators harness the marine waves to generate electricity.

It is therefore an objective of the present invention to provide a hydroelectricity generating system that combines at least one hydro-turbines and electric power generator and wave generators in order to improve efficiency of the hydroelectricity generating system. The present invention first utilizes the gravitational potential energy of a body of water to create wave energy so that the wave generators can convert the wave energy into compressed-air. Then, the gravitational potential energy of the body of water is utilized to generate hydroelectric power through the at least one hydro-turbine and electric power generator. Additionally, the compressed-air generated from the wave generators is utilized to pneumatically operate and control selective components of the present invention and to pressurize the water flow that travels through the at least one hydro-turbines and electric power generator.

DETAIL DESCRIPTIONS OF THE INVENTION

All illustrations of the drawings are for the purpose of describing selected versions of the present invention and are not intended to limit the scope of the present invention.

Figure 1:
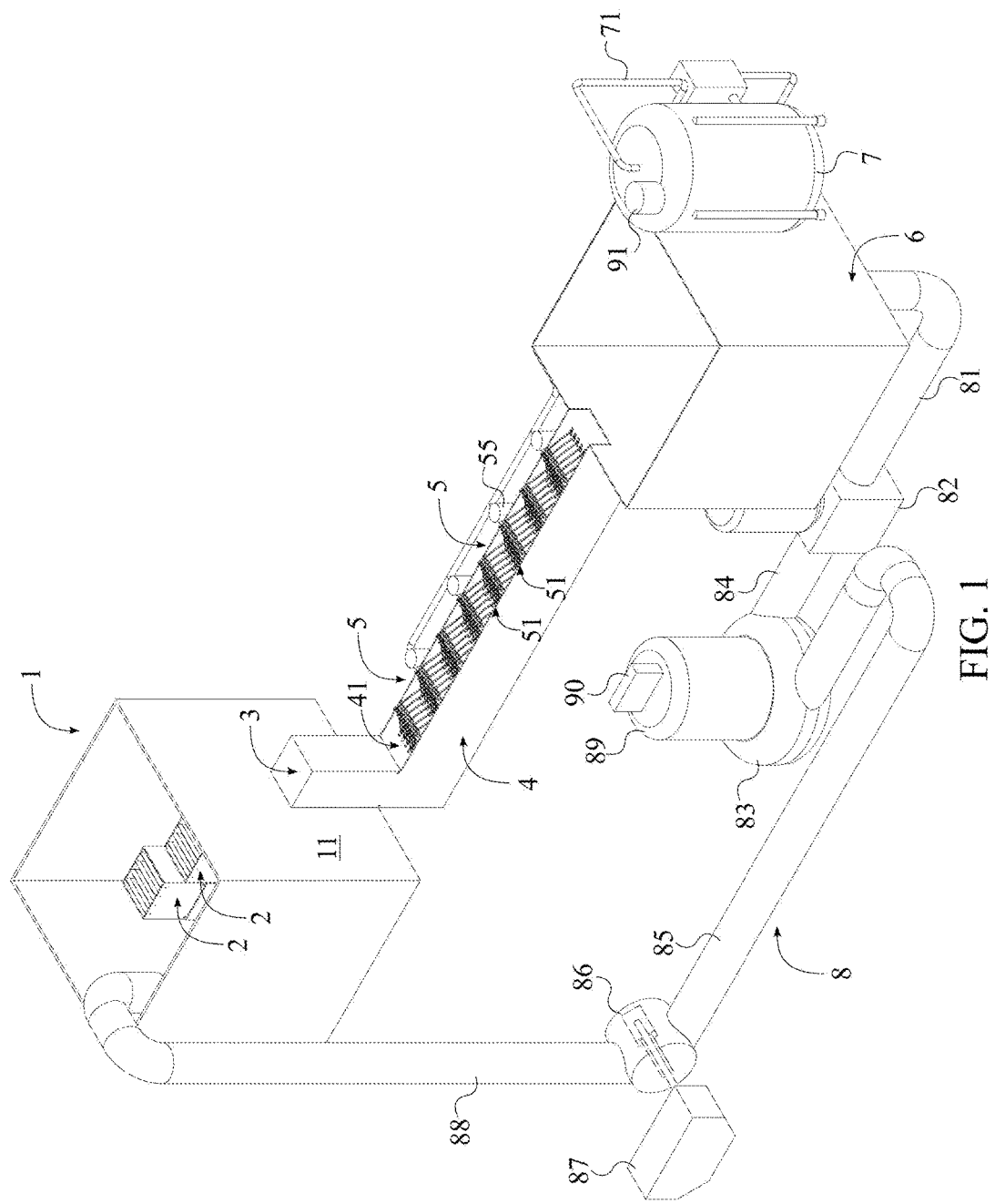
FIG. 1 is a perspective view of the present invention.

The present invention is a hydroelectricity and compressed-air power converter system that can be located in a remote area or near a water source. The present invention requires minimum amount of external energy to efficiently operate as a complete system; however, the present invention is able to generate large amount electricity and compressed-air as output products of the present invention. As illustrated in FIG. 1, the present invention comprises a first fill pool 1, a plurality of internal fill tanks 2, an external fill tank 3, a wave channel 4, a plurality of air-generator systems 5, a second fill pool 6, at least one air storage tank 7, and at least one generator system 8. In reference to the general configuration of the present invention, the first fill pool 1 is intermittently in fluid communication with the external fill tank 3 through the plurality of internal fill tanks 2 while the external fill tank 3 is intermittently in fluid communication with the second fill pool 6 through the wave channel 4. As a result, a set amount of water travels from the first fill pool 1 to the second fill pool 6 through the wave channel 4 so that the set amount of water can operates the plurality of air-generator systems 5. The second fill pool 6 is continuously in fluid communication with the first fill pool 1 through the at least one generator system 8 so that the set amount of water can be circulated within the present invention. The plurality of air-generator systems 5, which is connected along the wave channel 4, is discretely in fluid communication with the at least one air storage tank 7 through a collection pipe 71 of the at least one air storage tank 7. The present invention first uses the set amount of water that circulates with the plurality of air-generator systems 5 to generate compressed-air. The present invention then uses the set amount of water that circulates with the at least one generator system 8 to generate electricity. The present invention also uses an external energy source in conjunction with the least one air storage tank 7 and the at least one generator system 8 to maximize the efficiency of electricity and compressed-air generation. Even though the present invention is explained in relation to the set amount of water that circulates within the power converter system, the present invention can also function in conjunction with water sources such as rivers, streams, waterfalls, and canals.

Figure 3:
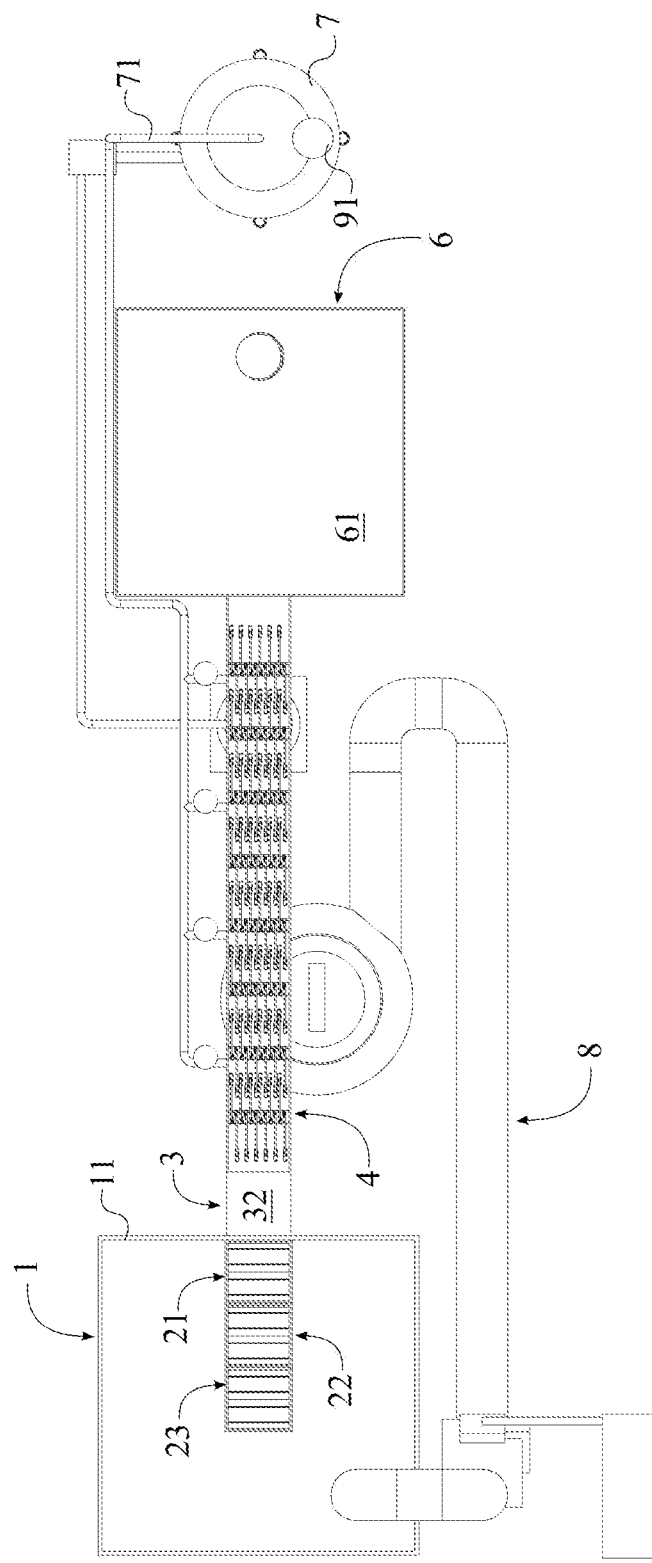
FIG. 3 is a top view of the present invention.

The first fill pool 1 retains a body of water that is required for the functionality of the present invention and functions as the platform member for the plurality of internal fill tanks 2 and the external fill tank 3. In reference to FIG. 3, each of the plurality of internal fill tanks 2 is linearly positioned with each other within the first fill pool 1 in a step-like configuration. More specifically, the plurality of internal fill tanks 2 is connected to a front wall 11 of the first fill pool 1. In reference to FIG. 5, the external fill tank 3 is adjacently connected to the front wall 11 of the first fill pool 1 but oppositely positioned of the plurality of internal fill tanks 2. The plurality of internal fill tanks 2 is submerged within the body of water for the first fill pool 1 and comprises a first fill tank 21, at least one second fill tank 22, and a third fill tank 23 within the preferred embodiment of the present invention. More specifically, the first fill tank 21 is connected to the first fill pool 1 and positioned opposite of the external fill tank 3. The first fill tank 21 is positioned offset from the external fill tank 3 and positioned atop the external fill tank 3 in such a way that the first fill tank 21 is elevated above the external fill tank 3. The second fill tank 22 is adjacently connected to the first fill tank 21 and positioned opposite of the external fill tank 3. The second fill tank 22 is positioned offset from the first fill tank 21 and positioned atop the first fill tank 21, wherein the second fill tank 22 is elevated above the first fill tank 21. The third fill tank 23 is adjacently connected to the second fill tank 22 and positioned opposite of the first fill tank 21. In order to maintain the step-like configuration for the plurality of internal fill tanks 2, the third fill tank 23 is also positioned offset from the second fill tank 22 and positioned atop the second fill tank 22 as the third fill tank 23 is elevated above the second fill tank 22.

Since the first fill pool 1 is intermittently in fluid communication with the external fill tank 3 through the plurality of internal fill tanks 2, each of the plurality of internal fill tanks 2 is sequentially filled with the set amount of water that is drained from the body of water within the first fill pool 1. More specifically, each of the plurality of internal fill tanks 2 comprises a top opening 24, a bottom opening 25, a tubular body 26, at least one top door 27, a first pneumatic actuator 92, a pair of bottom doors 28, a second pneumatic actuator 93, and a release channel 29 as shown in FIG. 6-FIG. 9. The top opening 24 and the bottom opening 25 are oppositely positioned of each other across the tubular body 26, wherein the top opening 24 allows the set amount of water to drain from the first fill pool 1 and into the tubular body 26. The at least one top door 27 that controls the set amount of water drained into the tubular body 26 is internally connected to the tubular body 26 and positioned adjacent to the top opening 24. The at least one top door 27 is operatively coupled with the first pneumatic actuator 92. The first pneumatic actuator 92 is in fluid communication with the at least one air storage tank 7 so that the compressed-air from the at least one air storage tank 7 is able to operate the at least one top door 27 with the first pneumatic actuator 92. Due to the configuration of the top opening 24 and operation of the at least one top door 27, the top opening 24 is intermittently in fluid communication with the first fill pool 1 through the at least one top door 27. The pair of bottom doors 28 is internally connected to the tubular body 26 and positioned adjacent to the bottom opening 25 as the bottom opening 25 discharges the set amount of water from the tubular body 26 into the external fill tank 3. Similar to the at least one top door 27, the pair of bottom doors 28 is operatively coupled with the second pneumatic actuator 93. The second pneumatic actuator 93 is in fluid communication with the at least one air storage tank 7 so that the compressed-air from the at least one air storage tank 7 is able to operate the pair of bottom doors 28 with the second pneumatic actuator 93. The release channel 29 that directs the required amount of water from the tubular body 26 is connected to the tubular body 26 adjacent to the bottom opening 25 and oppositely positioned of the top opening 24. The release channel 29 traverses into the external fill tank 3 through the front wall 11 of the first fill pool 1 so that the release channel 29 can intermittently in fluid communication with the external fill tank 3 by the pair of bottom doors 28.

A computerized control system and a plurality of liquid level sensors intermittently operate the at least one top door 27 and the pair of bottom doors 28 of each internal fill tank 2. More specifically, when the at least one top door 27 or the pair of bottom doors 28 need to be operated, the plurality of liquid level sensors detect the set amount of water within the tubular body 26 and relays that information to the computerized control system. Then, the computerized control system prompts the at least one air storage tank 7 to release a set of compressed air to the respective pneumatic actuator which in turn operates the at least one top door 27 or the pair of bottom doors 28. In other words, when an arbitrary fill tank from the plurality of internal fill tanks 2 need to be filled with the set amount of water, the at least one top door 27 of the arbitrary fill tank remains in an opened-position while the pair of bottom doors 28 of the arbitrary fill tank remains in a closed-position. As a result, the at least one top door 27 allows the set amount of water to be drained from the first fill pool 1 through the top opening 24 thus containing the set amount of water within tubular body 26. Once the set amount of water is drained into the tubular body 26, the at least one top door 27 is changed into the closed-position within the first fill pool 1 so that the water draining process can be stopped. Then the set amount of water within the tubular body 26 is discharged into the release channel 29 through the bottom opening 25 as the pair of bottom doors 28 changes from the closed-position to the opened-position. Then the set amount of water from the tubular body 26 is able to flow into the external fill tank 3 through the release channel 29. In order maximize the efficiency of the present invention, the at least one top door 27 and the pair of bottom doors 28 for each of a subsequent fill tank from the plurality of internal fill tanks 2 follows the same exact process of the arbitrary fill tank. More specifically, the plurality of internal fill tanks 2 is intermittently switched in between the opened-position and the closed-position in a systematic manner so that the set amount of water can be released into the external fill tank 3 with optimal time intervals. For example, when the arbitrary fill tank is the first fill tank 21 within the systematic process, the second fill tank 22 becomes the subsequent fill tank. When the arbitrary fill tank is the second fill tank 22 within the systematic process, the third fill tank 23 becomes the subsequent fill tank. When the arbitrary fill tank is the third fill tank 23 within the systematic process, the first fill tank 21 becomes the subsequent fill tank.

Figure 6:
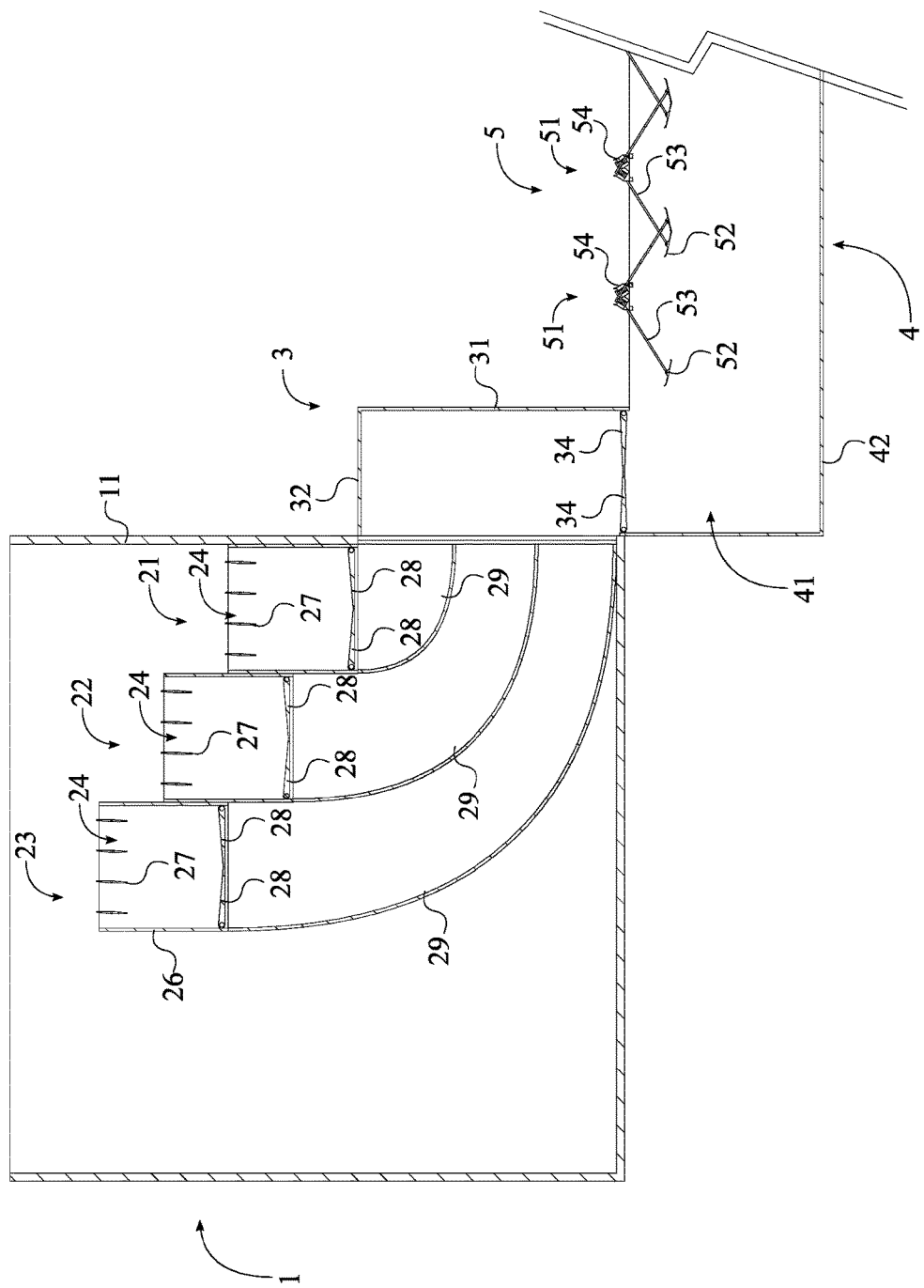
FIG. 6 is a partial side view of the present invention, showing the plurality of internal fill tanks, the external fill tank, and the wave channel with respect to the opened-position for the at least one top door, the closed-position for the pair of bottom doors, and the closed-position for the pair of pair of release doors.
Figure 7:
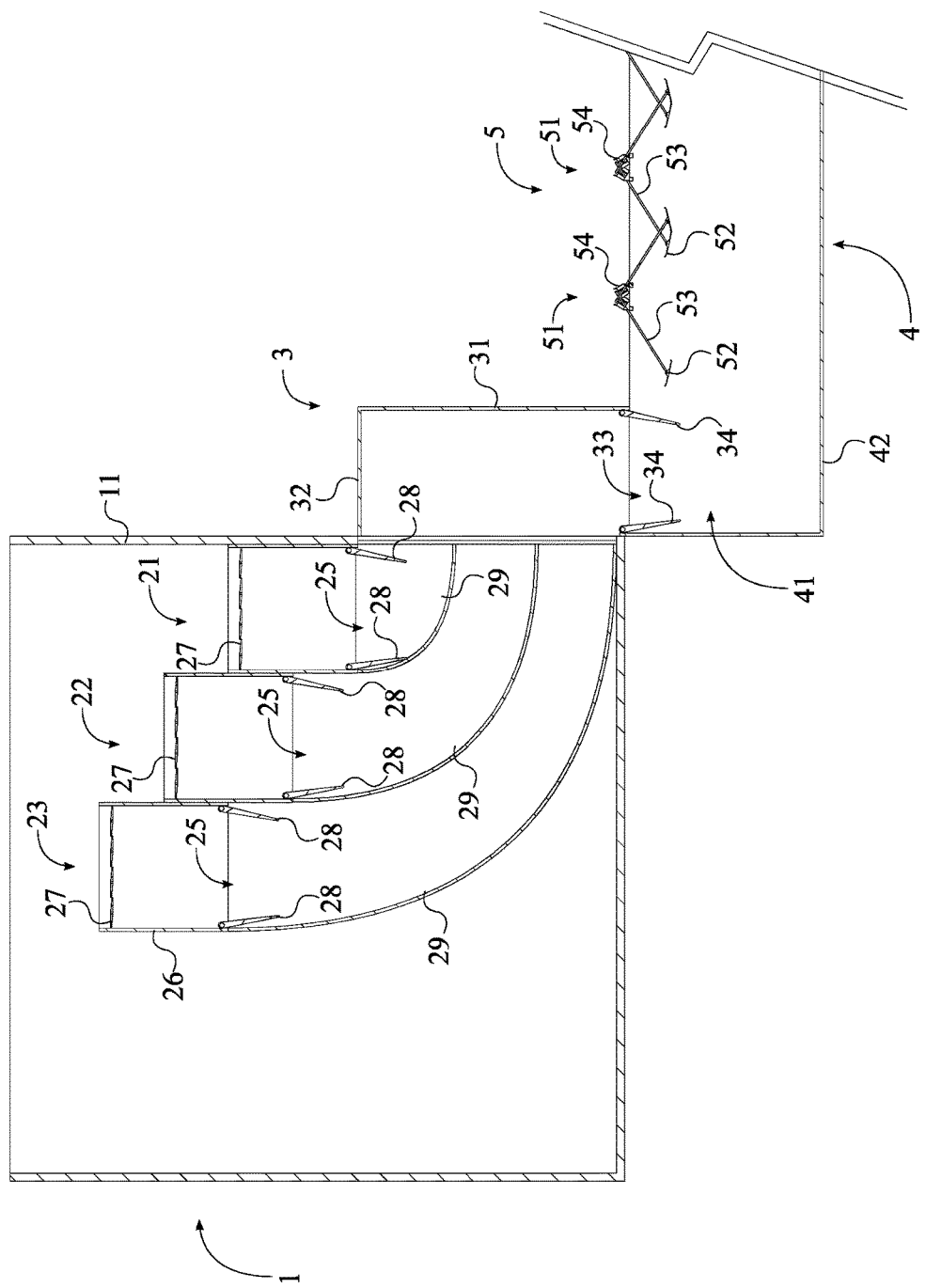
FIG. 7 is a partial side view of the present invention, showing the plurality of internal fill tanks, the external fill tank, and the wave channel with respect to the closed-position for the at least one top door, the opened-position for the pair of bottom doors, and the opened-position for the pair of pair of release doors.
Figure 8:
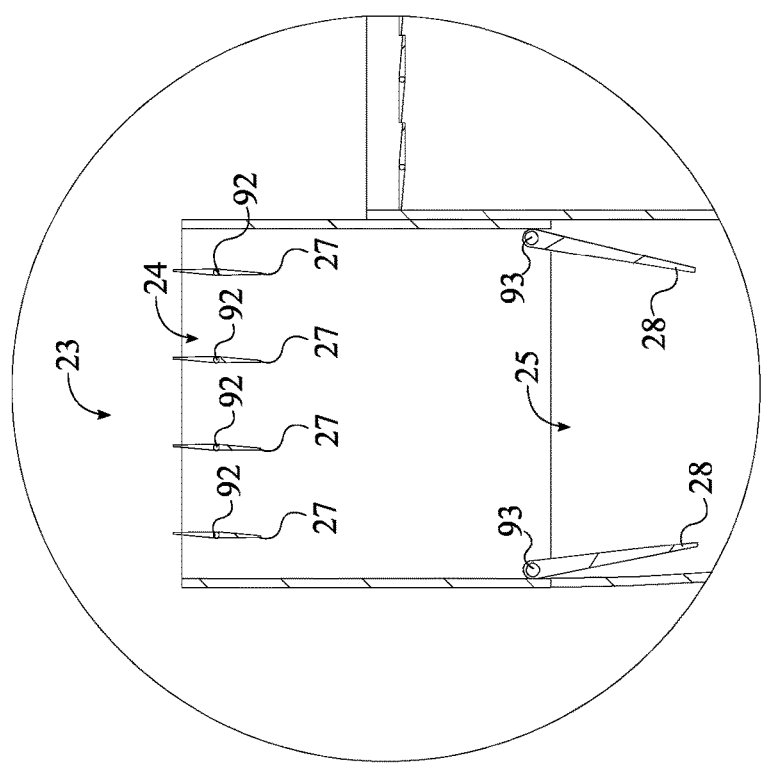
FIG. 8 is a detail view of the third fill tank of the present invention, showing the first and second pneumatic actuators.
Figure 9:
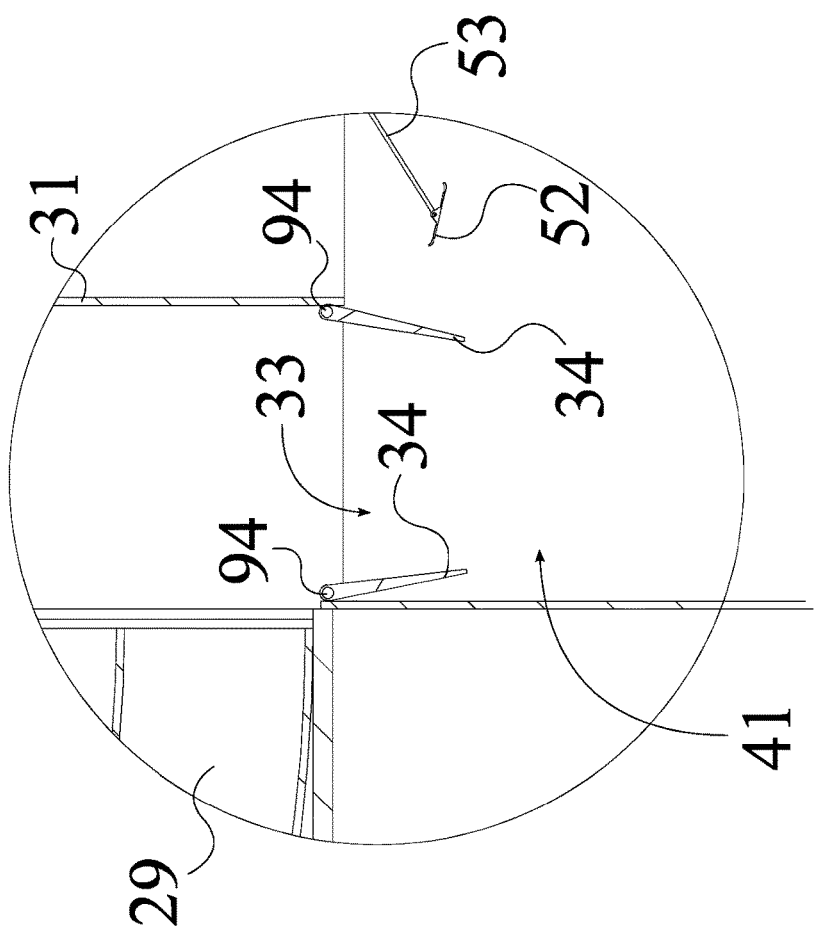
FIG. 9 is a detail view of the external fill tank of the present invention, showing the third pneumatic actuator.

In reference to FIG. 6 and FIG. 7, the external fill tank 3 that collects the set amount of water from each of the plurality of internal fill tanks 2 comprises a tubular member 31, a top surface 32, an outlet 33, a third pneumatic actuator 94, and a pair of release doors 34. The outlet 33 and the top surface 32 are oppositely positioned from each other across the tubular member 31 as the top surface 32 is perimetrically connected to the tubular member 31. The pair of release doors 34 is internally connected to the tubular member 31 and positioned adjacent to the outlet 33. The outlet 33 is intermittently in fluid communication with a channel opening 41 of the wave channel 4 so that the set amount of water contained within the external fill tank 3 can be released into the wave channel 4. The pair of release doors 34 controls how long the set amount of water is contained with the external fill tank 3 and the exact time interval that the set amount of water is released into the channel opening 41. More specifically, the pair of release doors 34 is operatively coupled with the third pneumatic actuator 94 that is in fluid communication with the at least one air storage tank 7. Due to the third pneumatic actuator 94 and the pair of release doors 34, the compressed-air from the at least one air storage tank 7 is able to operate the pair of release doors 34 with the third pneumatic actuator 94. For example, the computerized control system and a plurality of liquid level sensors maintain the pair of release doors 34 is at a closed-position, until the set amount of water is filled within the external fill tank 3. However, when the plurality of liquid level sensors detects that the set amount of water is filled within the external fill tank 3, the plurality of liquid level sensors relays that information to the computerized control system. Then, the computerized control system prompts the at least one air storage tank 7 to release a set of compressed air to the third pneumatic actuator 94 which in turn switches the pair of release doors 34 into an opened-position from the closed-position. Resultantly, the set amount of water is then released into the channel opening 41 through the outlet 33.

Figure 4:
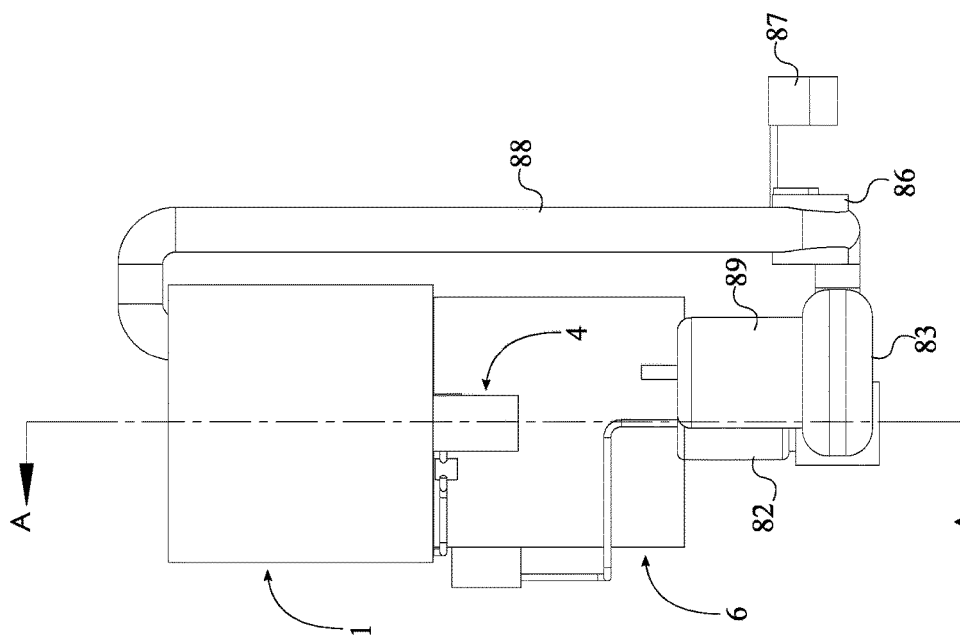
FIG. 4 is a side view of the present invention, showing the plan upon which a cross sectional view is taken shown in FIG. 5.
Figure 5:
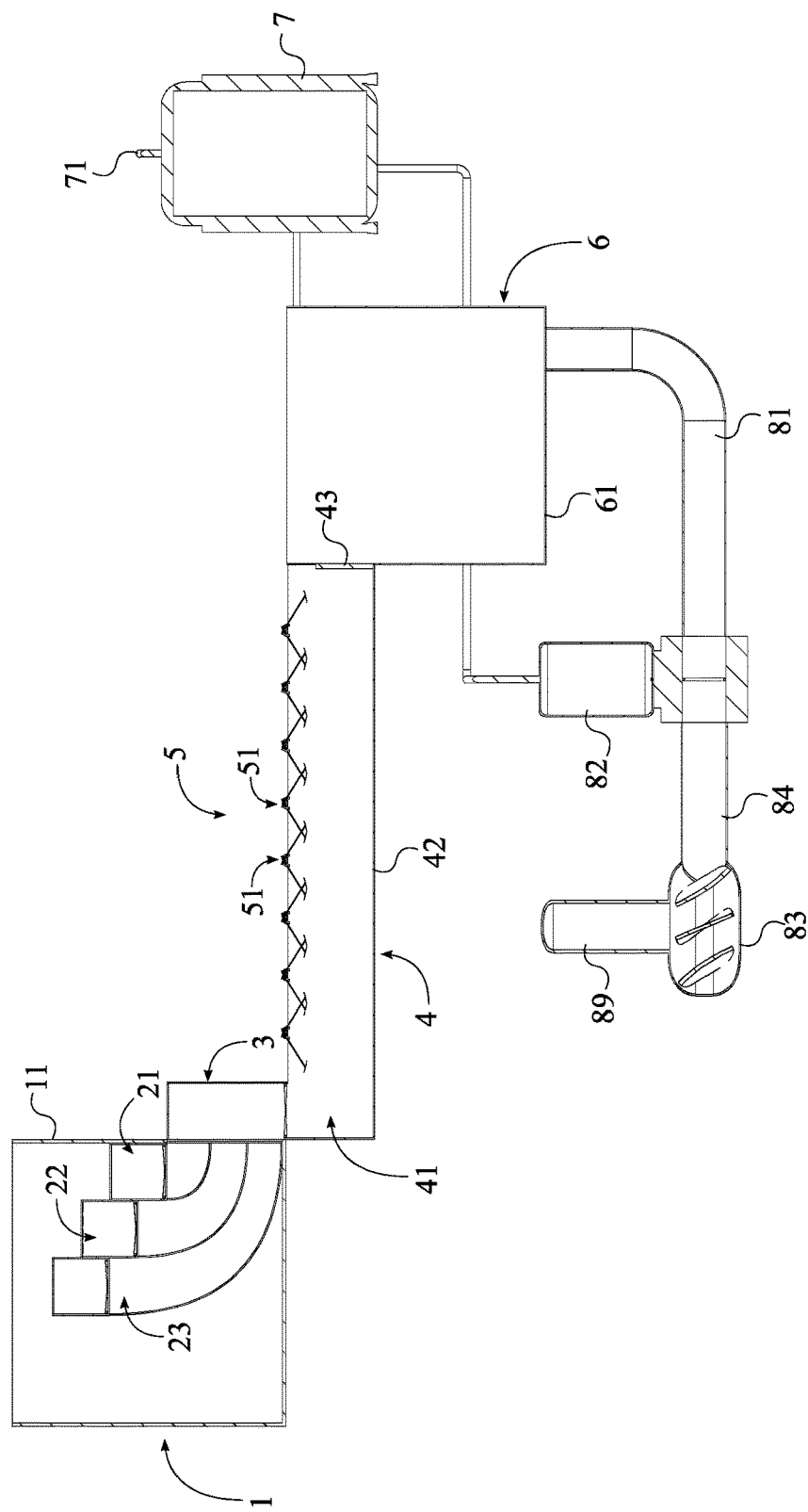
FIG. 5 is a cross sectional view of the present invention taken along line A-A of FIG. 4.

In reference to FIG. 4 and FIG. 5, the wave channel 4 that enables the in fluid communication between the first fill pool 1 and the second fill pool 6 comprises a channel base 42 and a weir 43 in addition to the channel opening 41 that extends along the channel base 42. The second fill pool 6 is connected to the channel base 42 and positioned opposite of the first fill pool 1, across the channel base 42. When the set amount of water is released from the external fill tank 3, the set amount of water travels down the wave channel 4 and flows into the second fill pool 6. More specifically, the weir 43 is positioned in between the channel base 42 and the second fill pool 6 and connected to the channel base 42 and the second fill pool 6. The weir 43 creates a barrier in between the wave channel 4 and the second fill pool 6 so that the wave channel 4 is always able to retain some amount of water within the channel base 42. The channel base 42 is also positioned atop a bottom surface 61 of the second fill pool 6, resulting a top edge of the wave channel 4 to be elevated up to a top edge of the second fill pool 6. As a result, the channel base 42 is in fluid communication with the second fill pool 6 adjacent to the weir 43. Once the external fill tank 3 releases the set amount of water into the wave channel 4, the set amount of water is released from the external fill tank 3 to the retaining water of the channel base 42 thus creating a plurality of waves within the wave channel 4. The wave trough and wave crest of the plurality of waves then force a body of water to travel along the length of the wave channel 4. Once the plurality of waves reaches the weir 43, an excess amount of water that rest above the weir 43 is drained into the second fill pool 6. Since the external fill tank 3 intermittently releases the set amount of water into the wave channel 4, the wave channel 4 is continuously able to maintain the plurality of waves that travels along the length of the wave channel 4.

In reference to FIG. 1, FIG. 6, and FIG. 7, the plurality of waves created by the external fill tank 3 and the wave channel 4 is captured with the plurality of air-generator systems 5 as each of the plurality of air-generator systems 5 is positioned along the wave channel 4. Each of the plurality of air-generator systems 5 comprises a plurality of wave generators 51 and a collection tank 55, wherein the plurality of wave generators 51 is in fluid communication with the collection tank 55. Each of the plurality of wave generators 51 comprises a wave paddle 52, a lever 53, and an air pump 54. The air pump 54, which produces the compressed-air required for the first pneumatic actuator 92, the second pneumatic actuator 93, and the third pneumatic actuator 94, is connected to the channel base 42 and adjacently positioned with the channel opening 41. Resultantly, the air pump 54 for each of the plurality of wave generators 51 is positioned above the plurality of waves of the wave channel 4. The lever 53 is operatively coupled with the air pump 54 from an end as the lever 53 operates the air pump 54 through the wave paddle 52. More specifically, the wave paddle 52 is hingedly connected to the lever 53, opposite of the air pump 54, and internally positioned with the channel base 42. Additionally, the wave paddle 52 is made as a flotation device so that the wave paddle 52 floats according to the plurality of waves of the wave channel 4. The lever 53 is pivotably mounted to the channel base 42 between the air pump 54 and the wave paddle 52. As a result, upward and downward movements of the wave paddle 52 are able move the lever 53 which subsequently powers the air pump 54. For example, when the plurality of waves is not present within the present invention, the wave paddle 52 just floats within the wave channel 4 without any upward and downward movements. However, when the plurality of waves travels down the wave channel 4, the wave crest of the plurality of waves vertically moves up the wave paddle 52 toward the channel opening 41 creating upward movement. Then, the wave trough of the plurality of waves vertically moves down the wave paddle 52 toward a bottom surface of the channel base 42 creating downward movement. The constant upward and downward movements of the wave paddle 52 continuously power the air pump 54 through the movements of the lever 53 so that air pump 54 can produce the compressed-air required for the present invention. The air pump 54 for each of the plurality of wave generators 51 is individually in fluid communication with the collection tank 55 so that the collection tank 55 can temporally store the compressed-air generated from the air pump 54. The in fluid communication between the air pump 54 and the collection tank 55 is preferably completed with a check valve to ensure that the compressed-air does not flow back into the air pump 54. The collection tank 55 for each of the plurality of air-generator systems 5 is also in fluid communication with the collection pipe 71. As a result of the in fluid communication of the collection tank 55 for each of the plurality of air-generator systems 5 and the collection pipe 71, the compressed-air collected within each collection tank 55 can be easily discharged through the collection pipe 71 and stored within the at least one air storage tank 7.

In reference to FIG. 1-3 and FIG. 5, the at least one generator system 8 generates the hydroelectricity within the present invention and is in fluid communication from the second fill pool 6 to the first fill pool 1. In other words, the set amount of water has to be traveled from the second fill pool 6, through the at least one generator system 8, and into the first fill pool 1 so that the present invention is able to produce hydroelectricity. The at least one generator system 8 comprises a main discharge pipe 81, an air compressor unit 82, a hydro-turbine unit 83, an electric power generator 89, a pump 86, an external power source 87, and a return pipe 88. The air compressor unit 82 is in fluid communication with the second fill pool 6 through the main discharge pipe 81 so that the air compressor unit 82 is able to receive a flow of water from the second fill pool 6. Since the second fill pool 6 continuously retains a body of water and receives the excess amount of water from the wave channel 4, the second fill pool 6 contains sufficient volume of water so that the air compressor unit 82 is able to receive a constant flow of water through the main discharge pipe 81. In order to maximize the volumetric flow rate of the water flow, the main discharge pipe 81 is preferably positioned adjacent to the bottom surface 61 of the second fill pool 6. The second fill pool 6 is also positioned atop the air compressor unit 82 to maximize the gravitational potential energy of the body of water that is retained within the second fill pool 6. Optionally, the bottom surface 61 of the second fill pool 6 can be formed into a funnel shape so that the body of water retained within the second fill pool 6 can achieve increased-fluid flow velocity through the vortex effect. The air compressor unit 82 is also in fluid communication with the at least one air storage tank 7 so that the compressed-air can be supplied to the air compressor unit 82. Then, the compressed-air within the air compressor unit 82 is mixed into the constant flow of water by gravity feed. The compressed-air then pressurizes the water flow while further increasing the volumetric flow rate. More specifically, a plurality of nozzles that is integrated into the air compressor unit 82 is perimetrically and evenly distributed around the constant flow water to provide a constant flow of compressed-air from the at least one air storage tank 7 thus pressurizing the water flow. The in fluid communication between the least one air storage tank 7 and the air compressor unit 82 is preferably completed with a check valve to ensure that the compressed-air does not flow back into the least one air storage tank 7.

Figure 2:
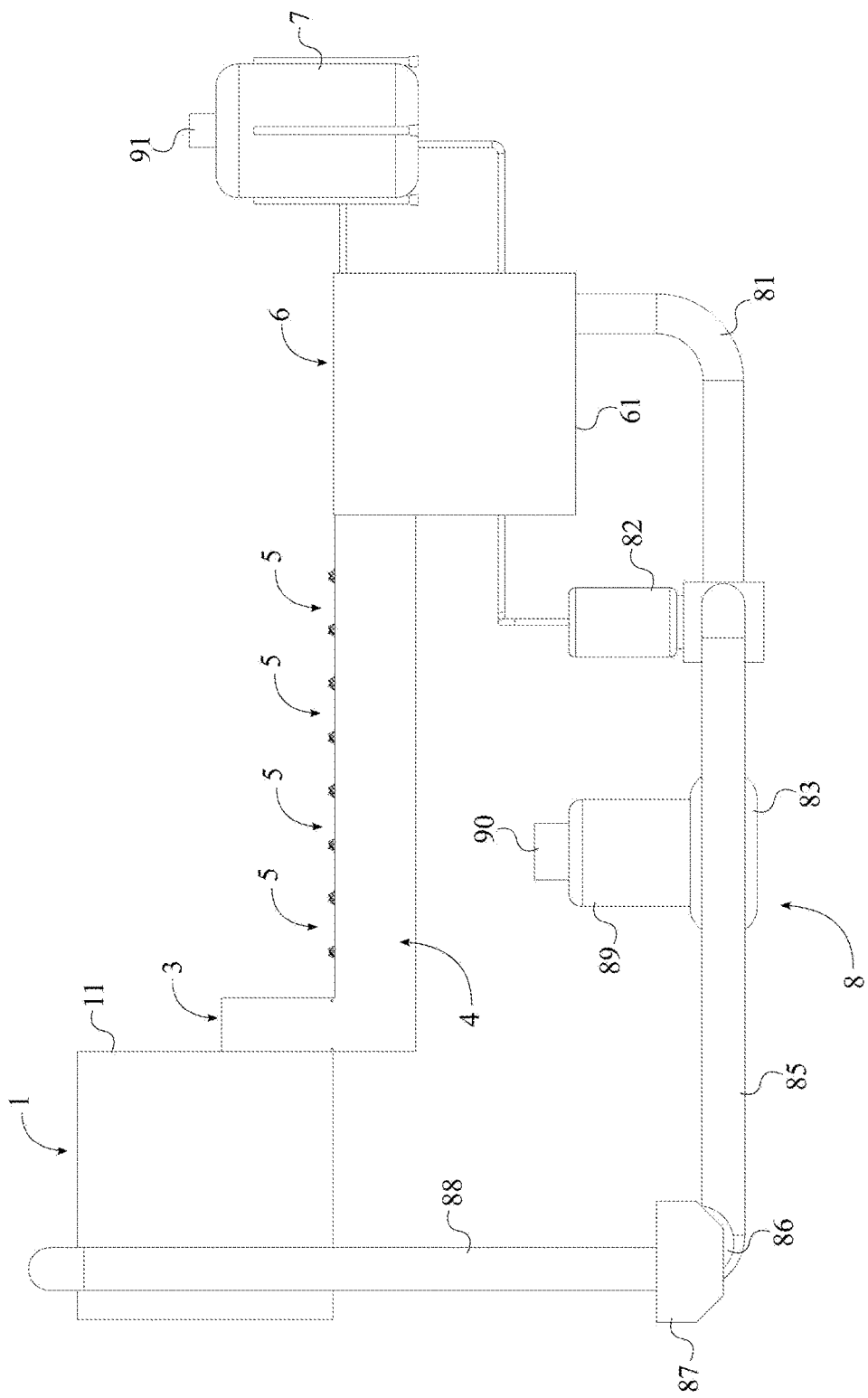
FIG. 2 is a side view of the present invention, showing the different elevations of the first fill pool, the external fill tank, the wave channel, the second fill pool, the air storage tank, and the generator system.

In reference to FIG. 2, the air compressor unit 82 is in fluid communication with the pump 86 through the hydro-turbine unit 83. More specifically, the hydro-turbine unit 83 is in fluid communication with the air compressor unit 82 through a turbine inlet pipe 84 of the hydro-turbine unit 83 so that the pressurized water flow from the air compressor unit 82 can be discharged into the hydro-turbine unit 83. Then the pressurized water flow rotates the hydro-turbine unit 83 and then exits into a turbine outlet pipe 85 of the hydro-turbine unit 83. In order to produce hydroelectricity, the electric power generator 89 is operatively coupled with the hydro-turbine unit 83. Preferably, a shaft can be utilized to concentrically and axially mount both the electric power generator 89 and the hydro-turbine unit 83. The electric power generator 89 is electrically connected with an output terminal 90 so that the output terminal 90 can be electrically connected with a power grid or a battery system to distribute the generated hydroelectricity. The turbine outlet pipe 85 and the turbine inlet pipe 84 are oppositely positioned from each other across the hydro-turbine unit 83 to maximize the volumetric flow rate of the pressurized water flow. The pump 86 is in fluid communication with the hydro-turbine unit 83 through the turbine outlet pipe 85, and the first fill pool 1 is in fluid communication with the pump 86 through the return pipe 88. The pump 86 first receives an exit water flow from the hydro-turbine unit 83 through the turbine outlet pipe 85 and then propels the exit water flow back into the first fill pool 1 through the return pipe 88. The pump 86 is electrically connected with the external power source 87 so that the external power source 87 is able to function as the external energy source for the pump 86. The external power source 87 can include, but not limited to, diesel generators and natural gas generators.

In reference to FIG. 2, the present invention is initially powered through an external air compressor 91 that is in fluid communication with the at least one air storage tank 7. More specifically, the external air compressor 91 is electrically connected with the external power source 87 so that the external air compressor 91 can be powered as the initial step. The external air compressor 91 then withdraws and compresses atmospheric air into the compressed-air, wherein the compressed-air is stored within the at least one air storage tank 7. Once sufficient compressed-air is present within the at least one air storage tank 7, the compressed-air is respectively and systematically discharged into the first pneumatic actuator 92, the second pneumatic actuator 93, the third pneumatic actuator 94, and the air compressor unit 82 to initiate the continuous operation of the present invention. Once the present invention is fully operational and sufficient compressed-air is present within the least one air storage tank 7, the external air compressor 91 can be manually or automatically shut-off.

Although the invention has been explained in relation to its preferred embodiment, it is to be understood that many other possible modifications and variations can be made without departing from the spirit and scope of the invention as hereinafter claimed.

What is claimed is:

1. A hydroelectricity and compressed-air power converter system comprises:
    a first fill pool;
    a plurality of internal fill tanks;
    an external fill tank;
    a wave channel;
    a plurality of air-generator systems;
    a second fill pool;
    at least one air storage tank;
    at least one generator system;
    the first fill pool being intermittently in fluid communication with the external fill tank through the plurality of internal fill tanks;
    the external fill tank being intermittently in fluid communication with the second fill pool through the wave channel;
    the plurality of air-generator systems being connected along the wave channel;
    each of the plurality of air-generator systems being discretely in fluid communication with the at least one air storage tank though a collection pipe of the at least one air storage tank;
    the second fill pool being continuously in fluid communication with the first fill pool through the at least one generator system;
    each of the plurality of internal fill tanks being linearly positioned with each other within the first fill pool in a step-like configuration;
    the plurality of internal fill tanks being adjacently connected to a front wall of the first fill pool; and
    the external fill tank being adjacently connected to the front wall of the first fill pool, opposite of the plurality of internal fill tanks.

2. The hydroelectricity and compressed-air power converter system as claimed in claim 1 comprises;
    the plurality of internal fill tanks comprises a first fill tank, at least one second fill tank, and a third fill tank;
    the first fill tank being connected to the first fill pool opposite of the external fill tank;
    the first fill tank being offset from the external fill tank and positioned atop the external fill tank;
    the second fill tank being adjacently connected to the first fill tank opposite of the external fill tank;
    the second fill tank being offset from the first fill tank and positioned atop the first fill tank;
    the third fill tank being adjacently connected to the second fill tank opposite of the first fill tank; and
    the third fill tank being offset from the second fill tank and positioned atop the second fill tank.

3. The hydroelectricity and compressed-air power converter system as claimed in claim 1 comprises;

each of the plurality of internal fill tanks comprises a top opening, a bottom opening, a tubular body, at least one top door, a first pneumatic actuator, a pair of bottom doors, a second pneumatic actuator, and a release channel;

the top opening and the bottom opening being oppositely positioned of each other across the tubular body;

the at least one top door being internally connected to the tubular body, adjacent to the top opening;

the at least one top door being operatively coupled with the first pneumatic actuator;

the first pneumatic actuator being in fluid communication with the at least one air storage tank, wherein compressed-air from the at least one air storage tank operates the at least one top door with the first pneumatic actuator;

the top opening being intermittently in fluid communication with the first fill pool through the at least one top door;

the pair of bottom doors being internally connected to the tubular body, adjacent to the bottom opening;

the pair of bottom doors being operatively coupled with the second pneumatic actuator;

the second pneumatic actuator being in fluid communication with the at least one air storage tank, wherein compressed-air from the at least one air storage tank operates the pair of bottom doors with the second pneumatic actuator;

the release channel being connected to the tubular body adjacent to the bottom opening;

the release channel being oppositely positioned of the top opening;

the release channel traversing into the external fill tank through a front wall the first fill pool; and the release channel being intermittently in fluid communication with the external fill tank by the pair of bottom doors.

4. The hydroelectricity and compressed-air power converter system as claimed in claim 1 comprises:

the external fill tank comprises a tubular member, a top surface, an outlet, a third pneumatic actuator, and a pair of release doors;

the outlet and the top surface being oppositely positioned from each other across the tubular member;

the top surface being perimetrically connected to the tubular member;

the pair of release doors being internally connected to the tubular member, adjacent to the outlet;

the pair of release doors being operatively coupled with the third pneumatic actuator;

the third pneumatic actuator being in fluid communication with the at least one air storage tank, wherein compressed-air from the at least one air storage tank operates the pair of release doors with the third pneumatic actuator; and the outlet being intermittently in fluid communication with a channel opening of the wave channel by the pair of release doors.

5. The hydroelectricity and compressed-air power converter system as claimed in claim 1 comprises:

the wave channel comprises a channel base, a channel opening, and a weir;

the channel opening being extended along the channel base;

the second fill pool being connected to the channel base and oppositely positioned from the first fill pool across the channel base;

the weir is positioned in between the channel base and the second fill pool;

the weir is connected to the channel base and the second fill pool;

the channel base being positioned atop a bottom surface of the second fill pool; and the channel base being in fluid communication with the second fill pool adjacent to the weir.

6. The hydroelectricity and compressed-air power converter system as claimed in claim 1 comprises:

each of the plurality of air-generator systems comprise a plurality of wave generators and a collection tank;

each of the plurality of wave generators comprises a wave paddle, a lever, and an air pump;

the air pump being mounted to a channel base of the wave channel and adjacently positioned with a channel opening of the wave channel;

the lever being operatively coupled with the air pump, wherein the air pump produces compressed-air;

the wave paddle being hingedly connected to the lever, opposite of the air pump;

the wave paddle being internally positioned with channel base;

the lever being pivotably mounted to the channel base in between the air pump and the wave paddle;

the air pump of each of the plurality of wave generator being in fluid communication with the collection tank, wherein the collection tank temporally stores compressed-air from the air pump; and the collection tank each of the plurality of air-generator systems being discretely in fluid communication with the collection pipe, wherein the collection pipe supplies compressed-air from the collection tank each of the plurality of air-generator systems to the at least one air storage tank.

7. The hydroelectricity and compressed-air power converter system as claimed in claim 1 comprises:

the at least one generator system comprises a main discharge pipe, an air compressor unit, a hydro-turbine unit, an electric power generator, a pump, an external power source, and a return pipe;

the air compressor unit being in fluid communication with the second fill pool with the main discharge pipe;

the second fill pool being positioned atop the air compressor unit;

the air compressor unit being in fluid communication with the at least one air storage tank, wherein the compressed-air from the at least one air storage tank is supplied to the air compressor unit;

the hydro-turbine unit being in fluid communication with the air compressor unit with a turbine inlet pipe of the hydro-turbine unit;

the pump being in fluid communication with the hydro-turbine unit with a turbine outlet pipe of the hydro-turbine unit;

the external power source being electrically connected with the pump;

the turbine inlet pipe and the turbine outlet pipe being oppositely positioned from each other across the hydro-turbine unit;

the electric power generator being operatively coupled with the hydro-turbine unit; and the first fill pool being in fluid communication with the pump with the return pipe.

8. The hydroelectricity and compressed-air power converter system as claimed in claim 7 comprises:

an external air compressor;

the least one air storage tank being in fluid communication with the external air compressor; and
the external air compressor being electrically connected with the external power source.

9. The hydroelectricity and compressed-air power converter system as claimed in claim 7 comprises:
an output terminal; and
the electric power generator being electrically connected with the output terminal.

10. A hydroelectricity and compressed-air power converter system comprises:
a first fill pool;
a plurality of internal fill tanks;
an external fill tank;
a wave channel;
a plurality of air-generator systems;
a second fill pool;
at least one air storage tank;
at least one generator system;
the at least one generator system comprises a main discharge pipe, an air compressor unit, a hydro-turbine unit, an electric power generator, a pump, an external power source, and a return pipe;
the first fill pool being intermittently in fluid communication with the external fill tank through the plurality of internal fill tanks;
the external fill tank being intermittently in fluid communication with the second fill pool through the wave channel;
the plurality of air-generator systems being connected along the wave channel;
each of the plurality of air-generator systems being discretely in fluid communication with the at least one air storage tank though a collection pipe of the at least one air storage tank; and
the air compressor unit being in fluid communication with the second fill pool with the main discharge pipe;
the air compressor unit being in fluid communication with the at least one air storage tank, wherein the compressed-air from the at least one air storage tank is supplied to the air compressor unit;
the hydro-turbine unit being in fluid communication with the air compressor unit with a turbine inlet pipe of the hydro-turbine unit;
the pump being in fluid communication with the hydro-turbine unit with a turbine outlet pipe of the hydro-turbine unit;
the external power source being electrically connected with the pump;
the electric power generator being operatively coupled with the hydro-turbine unit; and
the first fill pool being in fluid communication with the pump with the return pipe.

11. The hydroelectricity and compressed-air power converter system as claimed in claim 10 comprises:
each of the plurality of internal fill tanks being linearly positioned with each other within the first fill pool in a step-like configuration;
the plurality of internal fill tanks being adjacently connected to a front wall of the first fill pool; and
the external fill tank being adjacently connected to the front wall of the first fill pool, opposite of the plurality of internal fill tanks.

12. The hydroelectricity and compressed-air power converter system as claimed in claim 10 comprises;
the plurality of internal fill tanks comprises a first fill tank, at least one second fill tank, and a third fill tank;
the first fill tank being connected to the first fill pool opposite of the external fill tank;
the first fill tank being offset from the external fill tank and positioned atop the external fill tank;
the second fill tank being adjacently connected to the first fill tank opposite of the external fill tank;
the second fill tank being offset from the first fill tank and positioned atop the first fill tank;
the third fill tank being adjacently connected to the second fill tank opposite of the first fill tank; and
the third fill tank being offset from the second fill tank and positioned atop the second fill tank.

13. The hydroelectricity and compressed-air power converter system as claimed in claim 10 comprises;
each of the plurality of internal fill tanks comprises a top opening, a bottom opening, a tubular body, at least one top door, a first pneumatic actuator, a pair of bottom doors, a second pneumatic actuator, and a release channel;
the top opening and the bottom opening being oppositely positioned of each other across the tubular body;
the at least one top door being internally connected to the tubular body, adjacent to the top opening;
the at least one top door being operatively coupled with the first pneumatic actuator;
the first pneumatic actuator being in fluid communication with the at least one air storage tank, wherein compressed-air from the at least one air storage tank operates the at least one top door with the first pneumatic actuator;
the top opening being intermittently in fluid communication with the first fill pool through the at least one top door;
the pair of bottom doors being internally connected to the tubular body, adjacent to the bottom opening;
the pair of bottom doors being operatively coupled with the second pneumatic actuator;
the second pneumatic actuator being in fluid communication with the at least one air storage tank, wherein compressed-air from the at least one air storage tank operates the pair of bottom doors with the second pneumatic actuator;
the release channel being connected to the tubular body adjacent to the bottom opening;
the release channel being oppositely positioned of the top opening;
the release channel traversing into the external fill tank through a front wall the first fill pool; and
the release channel being intermittently in fluid communication with the external fill tank by the pair of bottom doors.

14. The hydroelectricity and compressed-air power converter system as claimed in claim 10 comprises:
the external fill tank comprises a tubular member, a top surface, an outlet, a third pneumatic actuator, and a pair of release doors;
the outlet and the top surface being oppositely positioned from each other across the tubular member;
the top surface being perimetrically connected to the tubular member;
the pair of release doors being internally connected to the tubular member, adjacent to the outlet;
the pair of release doors being operatively coupled with the third pneumatic actuator;
the third pneumatic actuator being in fluid communication with the at least one air storage tank, wherein compressed-air from the at least one air storage tank operates the pair of release doors with the third pneumatic actuator; and the outlet being intermittently in fluid communication with a channel opening of the wave channel by the pair of release doors.

15. The hydroelectricity and compressed-air power converter system as claimed in claim 10 comprises:

the wave channel comprises a channel base, a channel opening, and a weir;

the channel opening being extended along the channel base;

the second fill pool being connected to the channel base and oppositely positioned from the first fill pool across the channel base;

the weir is positioned in between the channel base and the second fill pool;

the weir is connected to the channel base and the second fill pool;

the channel base being positioned atop a bottom surface of the second fill pool; and the channel base being in fluid communication with the second fill pool adjacent to the weir.

16. The hydroelectricity and compressed-air power converter system as claimed in claim 10 comprises:

each of the plurality of air-generator systems comprise a plurality of wave generators and a collection tank;

each of the plurality of wave generators comprises a wave paddle, a lever, and an air pump;

the air pump being mounted to a channel base of the wave channel and adjacently positioned with a channel opening of the wave channel;

the lever being operatively coupled with the air pump, wherein the air pump produces compressed-air;

the wave paddle being hingedly connected to the lever, opposite of the air pump;

the wave paddle being internally positioned with channel base;

the lever being pivotably mounted to the channel base in between the air pump and the wave paddle;

the air pump of each of the plurality of wave generator being in fluid communication with the collection tank, wherein the collection tank temporally stores compressed-air from the air pump; and the collection tank each of the plurality of air-generator systems being discretely in fluid communication with the collection pipe, wherein the collection pipe supplies compressed-air from the collection tank each of the plurality of air-generator systems to the at least one air storage tank.

17. The hydroelectricity and compressed-air power converter system as claimed in claim 10 comprises:

the second fill pool being positioned atop the air compressor unit; and the turbine inlet pipe and the turbine outlet pipe being oppositely positioned from each other across the hydro-turbine unit.

18. The hydroelectricity and compressed-air power converter system as claimed in claim 10 comprises:

an external air compressor;

the least one air storage tank being in fluid communication with the external air compressor; and the external air compressor being electrically connected with the external power source.

19. The hydroelectricity and compressed-air power converter system as claimed in claim 10 comprises:

an output terminal; and the electric power generator being electrically connected with the output terminal.

* * * * *